J. HETTRICH.
AUTOMOBILE DRIVING GEAR.
APPLICATION FILED SEPT. 28, 1910.
1,032,903.
Patented July 16, 1912.
2 SHEETS—SHEET 1.
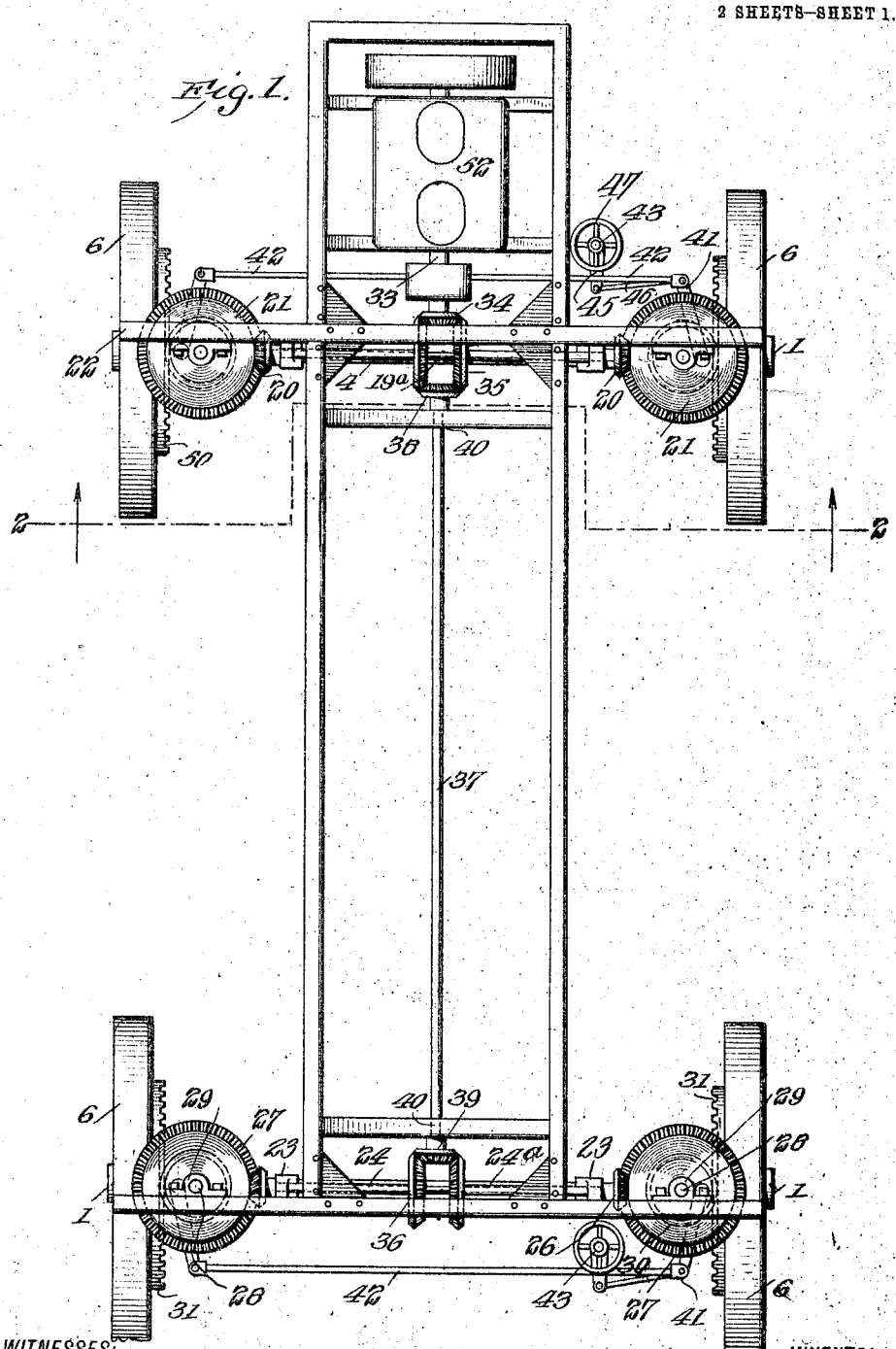

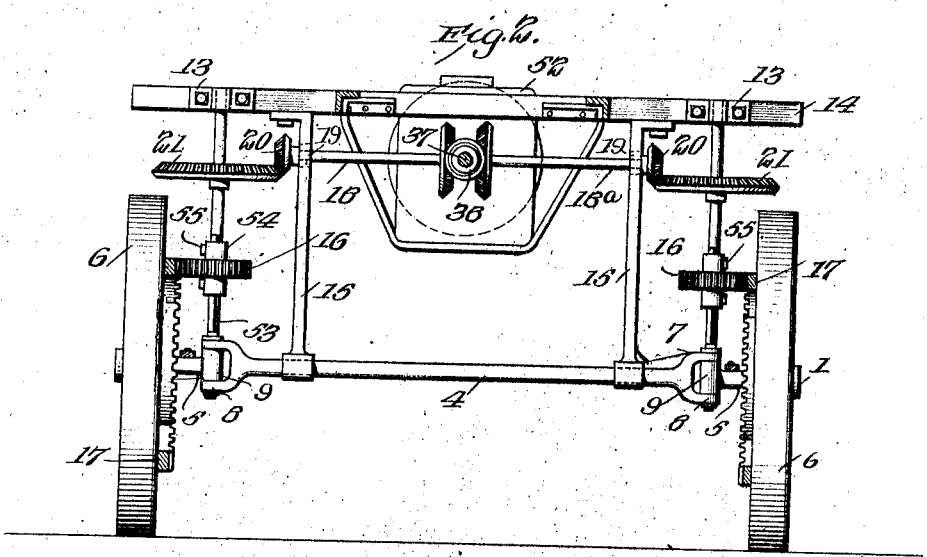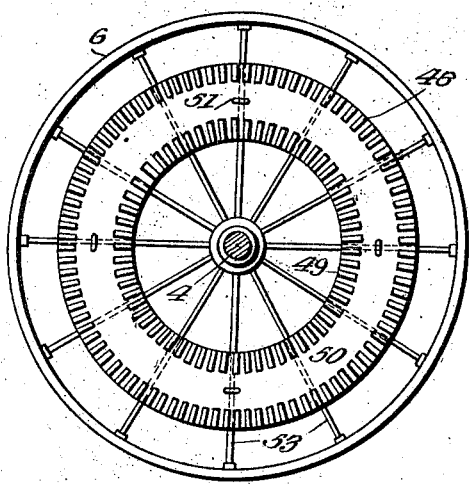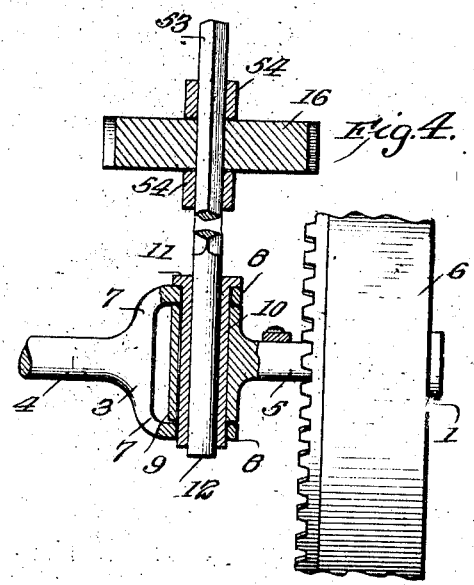

UNITED STATES PATENT OFFICE.

JOHN HETTRICH, OF LINCOLN, NEBRASKA.

AUTOMOBILE DRIVING-GEAR.

1,032,903.

Specification of Letters Patent.

Patented July 16, 1912.

Application filed September 26, 1910. Serial No. 584,316.

*To all whom it may concern:*

Be it known that I, JOHN HETTRICH, a citizen of the United States, and a resident of Lincoln, county of Lancaster, and State of Nebraska, have invented certain new and useful Improvements in Automobile Driving-Gears, of which the following is a specification.

My invention is an improvement in automobile driving gear, and consists in certain novel constructions, and combinations of parts, hereinafter described and claimed.

The object of the invention is to provide a direct driving connection between the motor and the wheels, so connected that there will be no interference with the steering mechanism, and wherein the differential connection of the wheels is independent of the axles.

Referring to the drawings forming a part hereof, Figure 1 is a plan view of a vehicle provided with the improvement. Fig. 2 is a front view. Fig. 3 is a face view of a wheel, and, Fig. 4 is a vertical section of the connection between the front axle and one of the wheel spindles.

Each axle body 4 is provided at each end with a spindle 5, pivoted to the axle for swinging movement on a vertical axis, and the wheels 6 are journaled on the spindles. Each end of the body of the axle is provided with an integral fork 3, each arm 7 of which is provided with a vertical bearing 8, in alinement with the bearing of the other arm. The adjacent end of the spindle is provided with an integral bearing sleeve 9, arranged between the arms 7, and in alinement with the bearings 8 of the said arms. A bushing 10 is passed through the alined bearings, the upper end of the bushing having a lateral marginal flange 11, resting upon the upper face of the upper arm 7, and is of such length that the lower end extends below the lower arm. A shaft 12 is journaled in each of the bushings, the lower end of the shaft extending to approximately the lower end of the bushing, and the upper end of the shaft is journaled in a bearing 13, in a cross bar 14 supported above the axle and parallel therewith by vertical struts 15. Each shaft 12 is provided near its lower end with a pinion 16, and each pinion meshes with a gear ring 17 on the adjacent wheel, the said ring being concentric with the wheel. Since the wheel swings on the shaft, the pinion will always mesh with the ring, whatever the position of the wheel.

A counter shaft 19ª is journaled transversely of the struts 15 in bearings 19, and a sleeve or hollow shaft is journaled on the shaft composed of two alined sections 18 and 18ª connected at their adjacent ends by a differential gearing 35 of usual form. A bevel pinion 20 is secured to the outer end of each section and meshes with a bevel gear wheel 21 near the upper end of the adjacent shaft 12. A cross bar 22 is supported above the rear axle by similar struts 23, and a countershaft is journaled on the struts. A sleeve consisting of sections 24 and 24ª is journaled on the shaft. The inner ends of the sections are connected by a differential gearing 36, and the outer end of each section is provided with a bevel pinion 26, which meshes with a bevel gear wheel 27, on a vertical shaft 28, journaled in bearings 29, on the cross bar 22 and on the rear axle. Each of the shafts 28 is provided with a pinion 30 which meshes with a gear ring 31, on the inner face of the adjacent rear wheel. It will be evident that the arrangement at the rear wheels is the same as that of the front wheels, and that both axles are solid instead of being divided.

The differential gearing connection between the shaft sections is of usual construction, and is entirely independent of the axle, so that the said axles are not weakened. The motor 52 of any usual or desired construction is provided with the usual shaft 33, extending rearwardly, and provided with a pinion 34, meshing with the differential gearing 35 of the front axle. A second shaft 37 is arranged in alinement with the shaft 33, and is provided at each end with a pinion 38, 39, respectively, the pinion 38 meshing with the differential 35 of the front axle, and the pinion 39 with the differential 36 of the rear axle. The said shaft 37 is supported in suitable bearings 40 on the frame.

Each of the spindles 5 is provided with a lateral lug or extension arm 41, and the arms of the spindles of each axle are connected by a link 42. A steering shaft 43 is journaled in bearings on the frame near each axle, and is provided with an arm 45, connected by a link 46 with one of the arms 45. It will be evident that when the shaft is turned by means of the hand wheel 47, the link will be moved longitudinally to swing either set of wheels in unison.

Any desired form of steering mechanism may be made use of, as may also any desired or usual form of motor. The improved gearing is especially suitable for vehicles designed for heavy loads, since the power of the motor is applied to the best advantage, and the frame construction is of great strength.

The axle construction permits a maximum load to be carried with a minimum of material, and eliminates a vital weakness in dispensing with the divided axle. The operating mechanism does not touch the axle, but is applied directly to the wheels.

As shown more particularly in Figs. 3 and 4, each wheel is provided with two series 48, 49, of gear teeth, both being formed on a ring 50, which ring is secured to the spokes 53 of the wheel by staples 51. The rings are concentric, and the pinions 16 or 30, as the case may be, are slidable on the shafts 12 or 28. The arrangement is the same for each wheel, and, as shown at 53 in Fig. 4, the shaft 12 is square over a portion of its length, and the pinion 16 is provided with a square opening for receiving the shaft. Collars 54 are arranged on the shaft, one on each side of the pinion, and the collars are held in place by set screws 55. The pinions may be moved radially of the wheels to engage them with either series of gear teeth, and when in position, may be held by the collars 54. When the pinions are engaged with the inner rings, less power with more speed is obtained, while when engaged with the outer rings, a slower speed with more power is obtained.

I claim:

1. In a device of the character specified, an axle provided at each end with a fork, each arm of the fork having a vertical bearing at its free end, the bearings of each fork being in alinement, a spindle at each end of the axle having a bearing sleeve between the arms of the adjacent fork and in alinement with the bearings of the arms, a bushing passing through the bearings, and having a marginal flange engaging the upper face of the upper arm, a wheel journaled on each spindle, a ring arranged concentrically on the inner face of each wheel, each ring having a plurality of annular series of gear teeth, a vertical shaft passing through each bushing, a pinion on each shaft for meshing with the gear rings, said pinion being movable longitudinally of the shaft, and rotating therewith, collars on each shaft above and below the pinion, means for holding the collars in adjusted position, a cross shaft, and a driving connection between each end of the cross shaft and the adjacent vertical shaft.

2. In a device of the character specified, an axle provided at each end with a fork, each arm of the fork having a vertical bearing at its free end, the bearings of each fork being in alinement, a spindle at each end of the axle having a bearing sleeve between the arms of the adjacent fork and in alinement with the bearings of the arms, a bushing passing through the bearings and having a marginal flange engaging the upper face of the upper arm, a wheel journaled on each spindle, a ring arranged concentrically on the inner face of each wheel, each ring having a plurality of annular series of gear teeth, a vertical shaft passing through each bushing, a pinion on each shaft for meshing with the gear rings, said pinion being movable longitudinally of the shaft, and rotating therewith, means for securing the pinion in adjusted position, a cross shaft, and a driving connection between each end of the cross shaft and the adjacent vertical shaft.

3. In a device of the character specified, an axle, a spindle at each end of the axle, a vertical shaft pivotally connecting each spindle with the adjacent end of the axle, a wheel on each spindle, a plurality of concentric gear rings on each wheel, a pinion slidable on each vertical shaft for engaging the rings, means for securing the pinion in adjusted position, a cross shaft, and a driving connection between each end of the cross shaft and the adjacent vertical shaft.

JOHN HETTRICH.

Witnesses:
 SOLON C. KEMON,
 C. E. TRAINOR.